(12) United States Patent
Binford

(10) Patent No.: US 10,822,180 B2
(45) Date of Patent: Nov. 3, 2020

(54) CHAIN FOR GRAIN ELEVATORS

(71) Applicant: iwis drive systems, LLC, Indianapolis, IN (US)

(72) Inventor: Andrew J. Binford, Indianapolis, IN (US)

(73) Assignee: iwis drive systems, LLC, Indianapolis, IN (US)

( * ) Notice: Subject to any disclaimer, the term of this patent is extended or adjusted under 35 U.S.C. 154(b) by 0 days.

(21) Appl. No.: 16/517,541

(22) Filed: Jul. 20, 2019

(65) Prior Publication Data

US 2020/0039760 A1 Feb. 6, 2020

Related U.S. Application Data

(60) Provisional application No. 62/713,322, filed on Aug. 1, 2018.

(51) Int. Cl.
| | | |
|---|---|---|
| *B65G 47/84* | (2006.01) | |
| *B65G 17/34* | (2006.01) | |
| *A01F 12/46* | (2006.01) | |
| *B65G 17/00* | (2006.01) | |

(52) U.S. Cl.
CPC .......... *B65G 47/841* (2013.01); *A01F 12/46* (2013.01); *B65G 17/34* (2013.01); *B65G 17/005* (2013.01)

(58) Field of Classification Search
CPC ...... B65G 19/00; B65G 47/841; B65G 17/34; B65G 17/12; B65G 17/36; B65G 47/84; A01F 12/46; G01F 1/30; G01F 1/80; G01F 15/00; G01F 15/028; A01D 41/12; A01D 41/1272; A01D 65/02; A01D 61/04

USPC ................................................ 198/730, 731
See application file for complete search history.

(56) References Cited

U.S. PATENT DOCUMENTS

| | | | |
|---|---|---|---|
| 572,448 A | 12/1896 | Ream et al. | |
| 810,010 A | 1/1906 | Wenzelmann et al. | |
| 4,411,353 A * | 10/1983 | McDole ................ | C03B 35/085 198/419.3 |
| 5,337,886 A * | 8/1994 | Anderson .............. | B65G 19/20 198/728 |
| 5,753,055 A | 5/1998 | Liu | |
| 6,843,867 B1 | 1/2005 | Foerster et al. | |
| 9,676,557 B2 | 6/2017 | Boydell et al. | |
| 9,974,238 B2 * | 5/2018 | Strnad .................... | A01F 12/46 |
| 10,123,487 B2 | 11/2018 | Strnad et al. | |

(Continued)

OTHER PUBLICATIONS

Drawing approved Mar. 9, 2017 of iwis drive system grain elevator chain of which two prototypes were sold for experimental purposes on May 3, 2017 (1 page).

*Primary Examiner* — James R Bidwell
(74) *Attorney, Agent, or Firm* — Bose McKinney & Evans LLP

(57) ABSTRACT

A paddle bracket with superior durability and a grain elevator chain including such a paddle bracket are disclosed. The paddle brackets are used to connect paddles for moving the grain to the chain. Each paddle bracket has a brace portion for giving additional support to the intermediate portion of the bracket between the portion of the paddle bracket that connects to the other links in the chain and that portion of the paddle bracket that attaches to the paddle. An austempering process for forming a bainitic microstructure in the paddle bracket to further enhance the strength of the paddle bracket is also disclosed.

20 Claims, 7 Drawing Sheets

(56) References Cited

U.S. PATENT DOCUMENTS

| | | |
|---|---|---|
| 10,131,501 B1 | 11/2018 | Kopf |
| 10,462,973 B2 | 11/2019 | Dilts et al. |
| 2016/0143221 A1* | 5/2016 | Koch ................. A01D 41/1272 73/861.73 |
| 2018/0359927 A1* | 12/2018 | Dilts ..................... B65G 17/36 |

* cited by examiner

CHAIN FOR GRAIN ELEVATORS

CROSS REFERENCE TO RELATED APPLICATIONS

This application claims priority under 35 U.S.C. 119(e) of U.S. provisional patent application Ser. No. 62/713,322 filed on Aug. 1, 2018 entitled CHAIN FOR GRAIN ELEVATORS the disclosure of which is hereby incorporated herein by reference.

BACKGROUND

Grain elevators are components in crop harvesting and storage systems used to move the harvested crop material through the harvesting or storage system. For example, crops such as wheat, corn, soybeans, etc. are typically harvested using combines. The crop is cut by the combine at ground level and the useful material is separated from unusable material. A grain elevator moves the clean grain from the bottom of the combine, where it is cut and threshed, to the top of the combine, where it enters the storage bin. A grain elevator might also be used to move tailings, i.e., grain that was not completely threshed, back to the threshing rotor.

Grain elevators generally include the same basic components regardless of the particular application. They have a housing, generally tubular, and means for moving the grain through the tubular housing such an augur or a chain drive system. Elevators having a chain drive system are often shaped like a rectangular tube, with a chain inside that moves in a circuit. Paddles are attached to the chain and as the chain moves, the paddles push the crop material from the tube's entry point to its exit point.

Grain elevator failures are often caused by the chain. As the chain wears, it moves out of alignment. A misaligned chain causes gaps between the paddles and the inner walls of the elevator housing. Grain can become pinched in those gaps and damaged. Since the price of the harvested grain is determined, in part, by the percentage of damaged grain, pinching is a costly problem. Further, when the gap between the paddles and the housing becomes large enough for grain to fall back through the elevator, the elevator jams and the chain or the belt may break.

Thus, there is a need for an improved chain drive system for grain elevators.

SUMMARY

Disclosed herein is a grain elevator chain with improved fatigue resistance and durability provided by paddle brackets with improved resistance to metal fatigue and failure.

Paddle brackets are the links in a grain elevator chain that connect the paddles to the chain. Metal fatigue in is a common cause of failure for paddle brackets. Grain elevator chains according to this disclosure are more durable than existing chains because they have paddle brackets with enhanced strength.

The invention comprises, in a form thereof, an elevator chain assembly having a length of chain defining a longitudinal axis. The length of chain includes a plurality of inner link plate pairs and a plurality of outer link plate pairs, wherein the inner link plate pairs and the outer link plate pairs alternate along the length of the chain and a plurality of pin assemblies are positioned at regularly spaced intervals along the length of the chain such that the plurality of pin assemblies pivotally connect the plurality of inner link plate pairs with the plurality of outer link plate pairs the pin assemblies each defining a pivot axis, and at least one paddle bracket replaces at least one of the inner link plates or the outer link plates. The paddle bracket is formed out of a sheet material and comprises a link portion, a paddle attachment portion, an intermediate portion and a brace portion. The link portion defines a link plane and has a first longitudinal end, a second longitudinal end, an elongate edge that extends from the first longitudinal end to the second longitudinal end, and an elongate boundary that extends from the first longitudinal end to the second longitudinal end opposite the elongate edge. The link portion is pivotally attached to an adjacent pair of link plates proximate each of the first and second longitudinal ends by first and second pin assemblies, and wherein the elongate boundary is parallel with the longitudinal axis between the first and second pin assemblies and the pivot axes of the first and second pin assemblies are located equidistantly between the elongate boundary and the elongate edge. The paddle attachment portion defines a paddle attachment plane extending transverse to the link plane and is attachable to a paddle. The intermediate portion defines an intermediate plane. The intermediate portion is disposed between the elongate boundary of the link portion and a first bent section and is longitudinally positioned between the paddle attachment plane and the second longitudinal end with the first bent section defining a bend between and connecting the intermediate portion and the paddle attachment portion whereby the intermediate plane and the paddle attachment plane are disposed at an angle to each other. The brace portion is disposed between the elongate boundary of the link portion and the intermediate portion and is longitudinally positioned between the first longitudinal end and the paddle attachment plane. The brace portion is coupled with the intermediate portion at a first location between the elongate boundary and the first bent section and is coupled with the link portion at a longitudinal location between the first longitudinal end and paddle attachment plane whereby the brace is capable of transmitting forces between the intermediate portion and the link portion.

In some embodiments, the paddle bracket is formed out of austempered steel. In such embodiments, the austempered steel may also have a bainitic microstructure. In a further variation of such embodiments, the paddle brackets may also be made out of a steel alloy with a medium carbon content within the range of 0.3 to 0.6 percent and a chromium content within the range of 0.4 to 1.1 percent.

In some embodiments, the paddle bracket defines a second bent section extending along the elongate boundary of the link portion between the link portion on one side of the second bent section and the brace portion and the intermediate portion on the other side of the second bent section and wherein the brace and the intermediate portion extend at an angle to the link plane and away from the longitudinal axis. In a further variation of such embodiments, the brace portion may lie within the same plane as the intermediate portion. In a further variation of such embodiments, the brace may be wedge-shaped and may define a progressively larger width from a tip of the wedge to an opposing end of the wedge with the tip of the wedge being disposed proximate the first longitudinal end of the link portion and the opposing end of the wedge being defined by where the brace is connected with the intermediate portion along a boundary parallel with the paddle attachment plane. In a further variation, the paddle bracket may be formed out of a single piece of continuous sheet material bent into its final configuration, the sheet material having a consistent thickness. As used herein, the term "consistent thickness" does not require absolute consistency, but also encompasses slight variations in thickness such as those variations falling within typical manufacturing tolerances for sheet material and slight deformations caused by bending and minor deformations proximate stamped edges.

In some embodiments, the paddle bracket replaces one of the outer link plates. In such embodiments, the paddle bracket may comprise a pair of paddle brackets, the pair of paddle brackets replacing one of the plurality of outer link plate pairs and the paddle attachment portions of the two paddle brackets may lie in a common plane whereby the pair of paddle brackets are adapted to be attached to a single planar paddle. In a further variation of such embodiments, a plurality of paddle bracket pairs may be regularly spaced along the length of the chain, replacing a corresponding plurality of outer link pairs, and each one of the plurality of paddle bracket pairs may be adapted to be attached to a single planar paddle and the elevator chain assembly may be formed into an endless loop with paddle attachment portions extending outwardly.

The invention comprises, in another form thereof, a paddle bracket for an elevator chain assembly. The elevator chain assembly has a length of chain defining a longitudinal axis, the length of chain includes a plurality of inner link plate pairs and a plurality of outer link plate pairs, wherein the inner link plate pairs and the outer link plate pairs alternate along the length of the chain and a plurality of pin assemblies are positioned at regularly spaced intervals along the length of the chain wherein the plurality of pin assemblies pivotally connect the plurality of inner link plate pairs with the plurality of outer link plate pairs and wherein a pair of the paddle brackets are adapted to replace one pair of either the plurality of inner link plate pairs or the plurality of outer link plate pairs. Each one of the pair of paddle brackets comprises a link portion, a paddle attachment portion, an intermediate portion and a brace portion. The link portion defines a link plane and has a first longitudinal end, a second longitudinal end, an elongate edge that extends from the first longitudinal end to the second longitudinal end, and an elongate boundary that extends from the first longitudinal end to the second longitudinal end opposite the elongate edge. The link portion is pivotally attached to an adjacent pair of link plates proximate each of the first and second longitudinal ends by first and second pin assemblies, and the elongate boundary is parallel with the longitudinal axis between the first and second pin assemblies and the pivot axes defined by the first and second pin assemblies are located equidistantly between the elongate boundary and the elongate edge. The paddle attachment portion defines a paddle attachment plane extending transverse to the link plane and is attachable to a paddle. The intermediate portion defines an intermediate plane. The intermediate portion is disposed between the elongate boundary of the link portion and a first bent section and is longitudinally positioned between the paddle attachment plane and the second longitudinal end with the first bent section defining a bend between and connecting the intermediate portion and the paddle attachment portion whereby the intermediate plane and the paddle attachment plane are disposed at an angle to each other. The brace portion is disposed between the elongate boundary of the link portion and the intermediate portion and is longitudinally positioned between the first longitudinal end and the paddle attachment plane. The brace portion is coupled with the intermediate portion at a first location between the elongate boundary and the first bent section and is coupled with the link portion at a longitudinal location between the first longitudinal end and paddle attachment plane whereby the brace is capable of transmitting forces between the intermediate portion and the link portion.

In some embodiments, the paddle bracket is formed out of austempered steel. In such embodiments, the austempered steel may have a bainitic microstructure. In a further variation of such embodiments, the paddle brackets may also be made out of a steel alloy with a medium carbon content within the range of 0.3 to 0.6 percent and a chromium content within the range of 0.4 to 1.1 percent.

In some embodiments, the paddle bracket may define a second bent section extending along the elongate boundary of the link portion between the link portion on one side of the second bent section and the brace portion and the intermediate portion on the other side of the second bent section. The brace and the intermediate portion may extend at an angle to the link plane and away from the longitudinal axis and the brace portion may lie within the same plane as the intermediate portion. The brace portion may be wedge-shaped and define a progressively larger width from a tip of the wedge to an opposing end of the wedge with the tip of the wedge being disposed proximate the first longitudinal end and the opposing end of the wedge being defined by where the brace portion is connected with the intermediate portion along a boundary parallel with the paddle attachment plane. The paddle bracket may be formed out of a single piece of continuous sheet material bent into its final configuration, the sheet material having a consistent thickness.

The invention comprises, in another form thereof, a method for making a paddle bracket for use with an elevator chain assembly. The method includes stamping the paddle bracket from a sheet of material having a consistent thickness. The stamped paddle bracket includes a link portion, a paddle attachment portion, an intermediate portion and a brace portion. The link portion has a first longitudinal end, a second longitudinal end, an elongate edge that extends from the first longitudinal end to the second longitudinal end, and an elongate boundary that extends from the first longitudinal end to the second longitudinal end opposite the elongate edge. First and second openings are stamped into the link portion, the first opening proximate the first longitudinal end and the second opening proximate the second longitudinal end. The first and second openings are adapted to receive pin assemblies for attaching the paddle bracket to the chain assembly. The elongate boundary is parallel to a longitudinally extending line connecting the centers of the first and second openings. The intermediate portion is disposed between the elongate boundary of the link portion and a first bent section and is longitudinally positioned between the second longitudinal end and a first longitudinal position between the first and second openings. The first bent section connects the intermediate portion and the paddle attachment portion. The brace portion is disposed between the elongate boundary of the link portion and the intermediate portion and longitudinally positioned between the first longitudinal end and the first longitudinal position. The brace portion couples with the intermediate portion at the first longitudinal position between the elongate boundary and the first bent section and couples with the link portion between the first longitudinal end and the first longitudinal position. A second bent section extends parallel with the elongate boundary and connects the link portion with the brace portion and the intermediate portion. The method further includes bending the first bent section to position the paddle attachment portion at an angle relative to the intermediate portion and bending the second bent section to position the link portion at an angle relative to the intermediate portion and the brace portion such that a paddle attachment plane defined by the paddle attachment portion is oriented transverse to a link plane defined by the link portion. Although the steps of the method are presented in a specific order, some of the steps, e.g., the bending steps, may be conducted in a different order than the one in which they are presented here.

In some embodiments, the method may further include heating the paddle bracket to a temperature above the austenitizing temperature of the sheet material and quenching the heated paddle bracket at a temperature above the martensite start temperature of the sheet material. In a further variation of such embodiments, the sheet material may be a steel alloy with a medium carbon content within the range of 0.3 to 0.6 percent and a chromium content within the range of 0.4 to 1.1 percent. In a still further variation, the method may include attaching a pair of the paddle brackets to a chain assembly and attaching a single paddle to the pair of paddle brackets.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DETAILED DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

The terms "grain", "straw" and "tailings" are used throughout this specification for convenience; these terms are not intended to be limiting. Thus, "grain" refers to the part of the crop material that is threshed and separated from the non-grain part of the crop material which is generally referred to herein as "straw". Incompletely threshed crop material is referred to as "tailings".

The terms "forward", "rearward", "left" and "right", when used in connection with an agricultural harvester are usually determined with reference to the direction of forward travel of the harvester, but they should not be construed as limiting.

Figure 1:
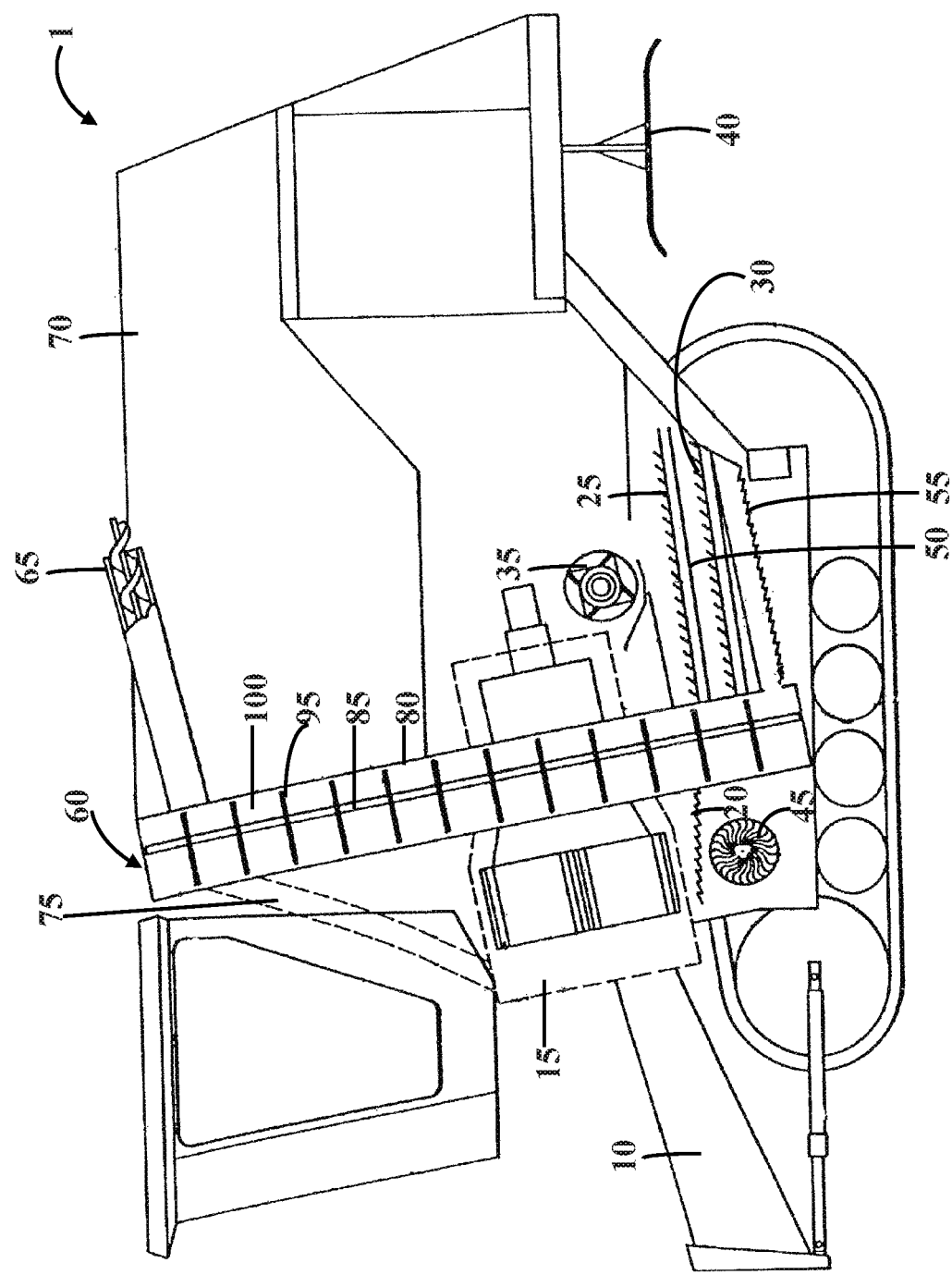
FIG. 1 is a schematic partial cut-away side view of a combine.

Referring to FIG. 1, combine 1 is an example of an agricultural harvester that can use an elevator chain as disclosed. Combine 1 has a header support 10, which attaches a conventional header (not shown) to the combine. The header has a sickle which cuts the crop and feeds it through the header support 10 to the threshing rotor 15, which threshes the grain. As grain is separated from straw, the straw is discharged from the back of threshing rotor 15 into a transverse beater 35 and out the rearward end of combine 1. A rotating spreader 40 spreads the straw on the ground.

Meanwhile, threshed grain falls through perforations in the housing of threshing rotor 15 onto a shoe 20. The grain moves down shoe 20 and onto sieves 25 and 30. Sieves 25 and 30 have a plurality of fingers which define apertures. A blower 45 blows air upward through the sieves 25, 30 and out the rearward end of combine 1. Chaff is blown along with the air.

Clean grain falls through the apertures in sieves 25, 30 onto an inclined clean grain pan 50. Grain that was not completely threshed will not fit through the apertures in the sieves 25, 30. It will, instead, travel down the sieves and fall into an inclined tailings pan 55.

In combine 1, an elevator 60 transports the clean grain from the clean grain pan 50 to auger 65 and auger 65 moves the clean grain to storage bin 70. Elevator 60 also transports the tailings from tailings pan 55 to chute 75. The tailings fall through chute 75 back into threshing rotor 15 so that they can be re-threshed.

Combine 1 is just one example of an application for grain elevators and it is not intended to limit the application of this disclosure. For example, crop material other than grain may travel through a grain elevator. Crop material may enter and exit a grain elevator from one or more locations. Crop material may enter and exit the elevator by various means, such as auger or gravity feed. Crop material may also be moved horizontally by a grain elevator.

Figure 2A:
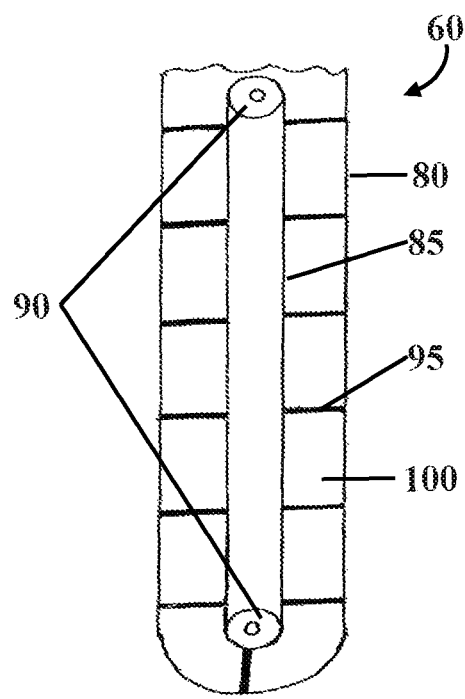
FIGS. 2A-C are schematic cross-sectional views of different exemplary embodiments of a grain elevator.
Figure 2B:
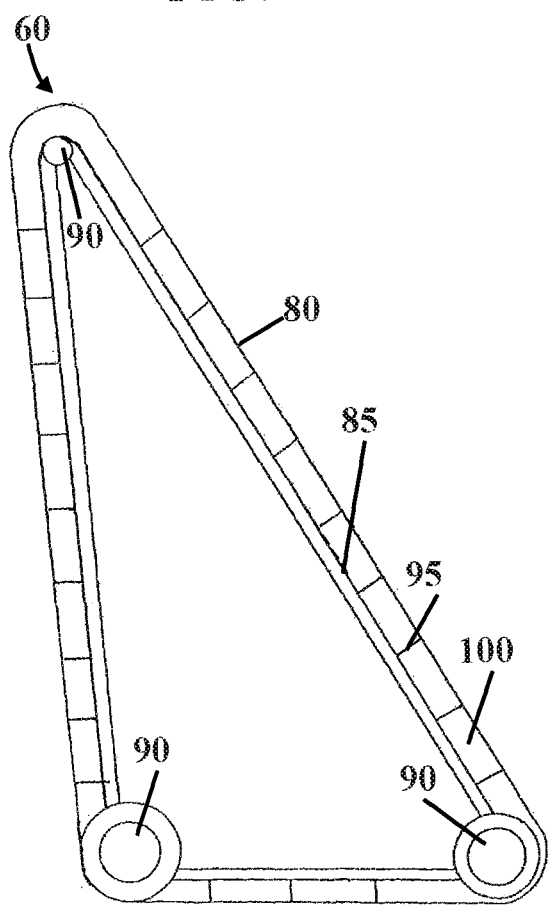
Figure 2C:
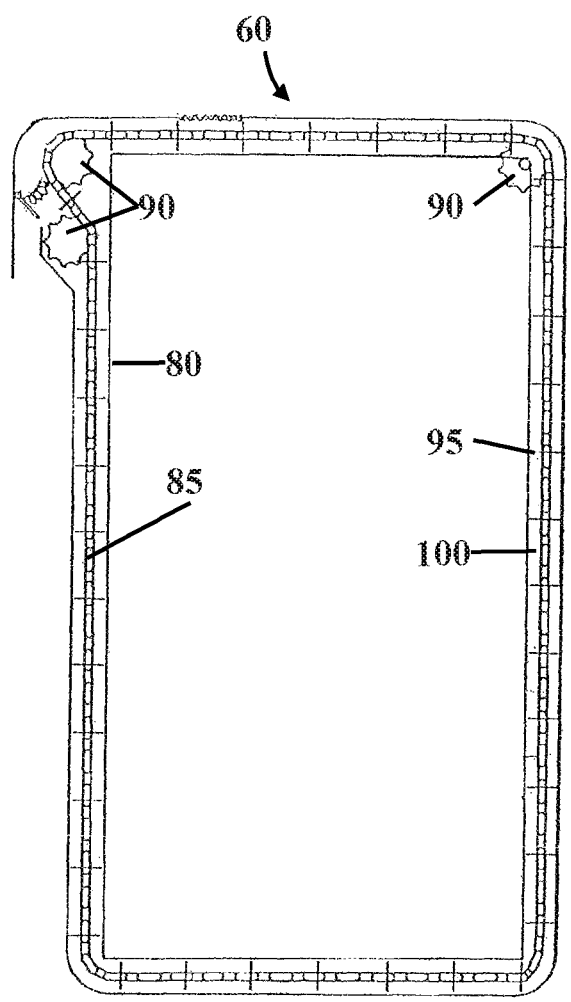

FIGS. 2A-C depict a few of the many possible configurations for an elevator 60. Regardless of shape, elevator 60 will generally include an elevator housing 80. An elevator chain 85 runs through the center of elevator housing 80. Sprockets 90 drive the chain 85. Paddles 95 are attached to elevator chain 85 and compartments 100 are formed between the paddles 95. The grain is pushed along through the elevator 60 by the paddles 95.

Figure 3A:
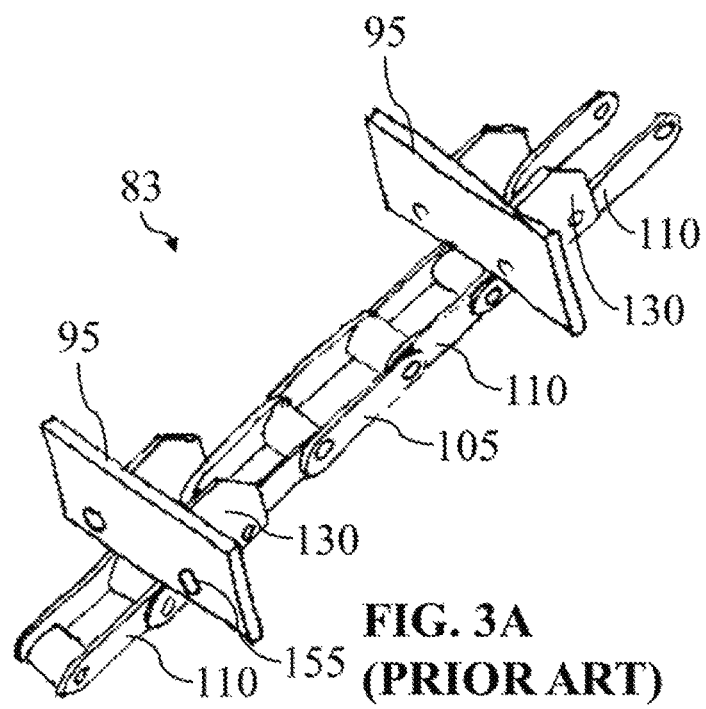
FIG. 3A is a perspective view of a prior art chain with paddles.
Figure 3B:
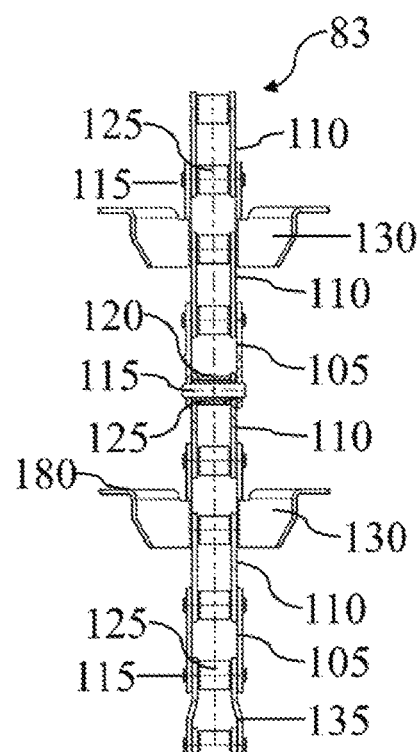
FIG. 3B is a top view of a prior art chain.

FIGS. 3A and 3B show a common example of a grain elevator chain 83 according to the prior art. The chain in FIGS. 3A and 3B is, essentially, a roller chain interspersed with paddle brackets 130 for connecting the paddles 95 to the chain 83.

Figure 4:
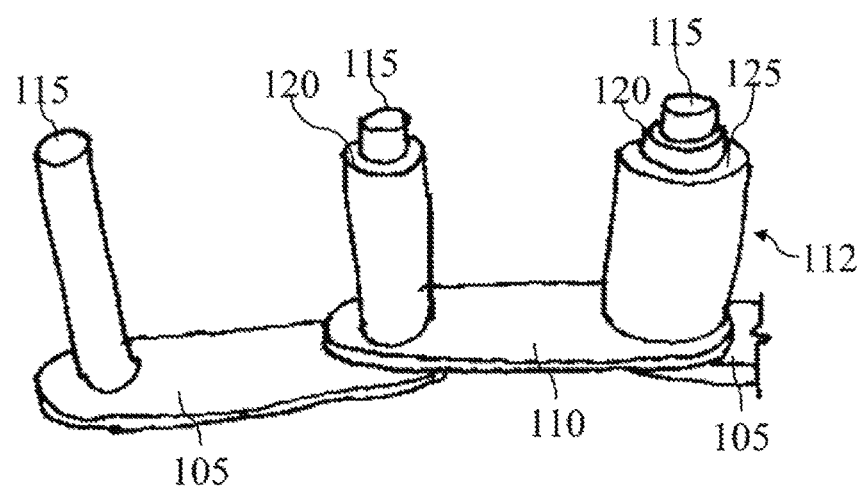
FIG. 4 is a perspective view of a pin assembly and two partial pin assemblies.

FIG. 4 shows an example of a pin assembly 112 for making connections between the link plates. Pin assembly 112 has a conventional configuration well-known to those having ordinary skill in the art and includes a pin 115 that connects a pair of inner link plates 110 with a pair of outer link plates 105. A bushing 120 surrounds the pin 115 and a roller 125 surrounds the bushing 120. FIG. 4 shows partial assemblies to enhance understanding of the pin assemblies 112.

Returning to FIGS. 3A and 3B, the link plates for the exemplary prior art elevator chain 83 are arranged according to the pattern: inner link plate 110, prior art paddle bracket 130, inner link plate 110, outer link plate 105, inner link plate 110, paddle bracket 130. The illustrated chain includes an offset link plate 135, which can connect an outer link plate 105 with an inner link plate 110 to form an endless loop. Offset link plates are used to connect the chain to itself when there are an odd number of total links and are unnecessary when there are an even number of total links.

Figure 5A:
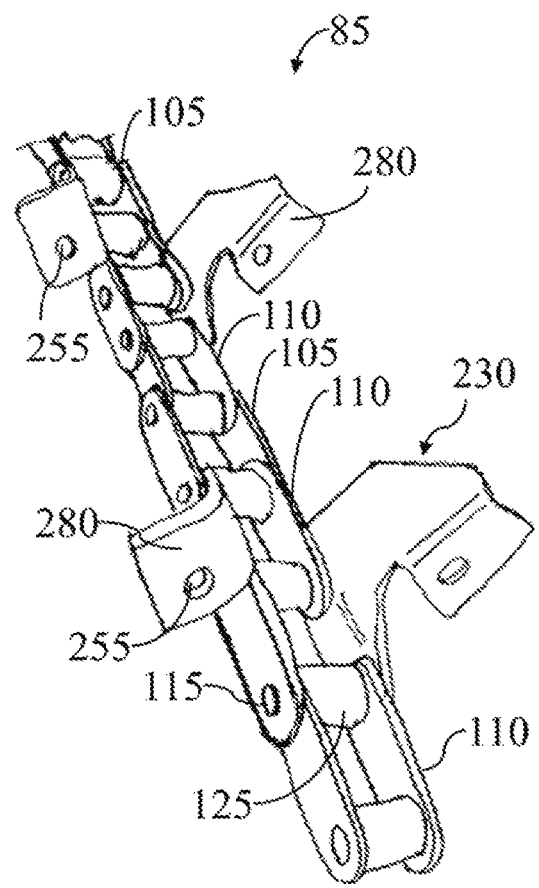
FIG. 5A is a perspective view of an exemplary embodiment of a grain elevator chain.
Figure 5B:
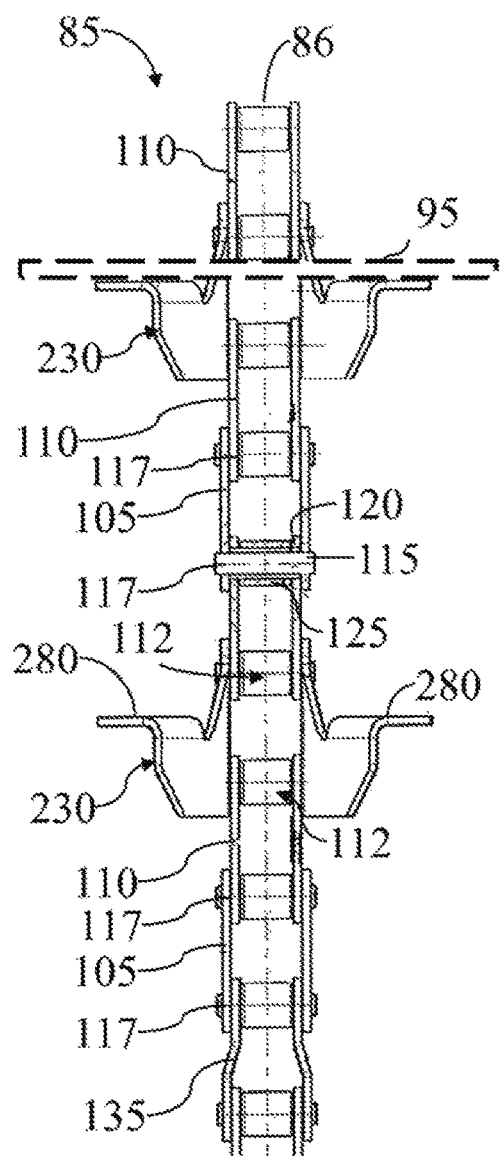
FIG. 5B is a top view of the grain elevator chain of FIG. 5A.

FIGS. 5A and 5B depict an exemplary elevator chain 85 having a paddle bracket 230 with enhanced resistance to metal fatigue. The longitudinal axis 86 of elevator chain 85 is shown as a dashed line. Longitudinal axis 86 is formed by a series of linear segments extending along the center of the chain between adjacent pin assemblies 112. Adjacent linear segments of longitudinal axis 86 may form an angle if the chain is pivoted at the pin assembly where the segments meet. The link plates in the illustrated embodiment of chain 85 are arranged in alternating pairs of inner and outer link plate pairs and use pin assemblies 112 similar to the prior art chain 83 just discussed. Chain 85, however, includes paddle brackets 230 that differ from the prior art paddle brackets 130.

In chain 85, a pair of inner link plates 110 are followed by a pair of paddle brackets 230 followed by another pair of inner link plates 110 and then a pair of outer link plates 105 and then this series is repeated. In other words, along the length of the chain, the chain includes a plurality of inner link plate pairs and a plurality of outer link plate pairs wherein the inner and outer link plate pairs alternate along the length of the chain wherein, in the illustrated embodiment, every other pair of outer link plate pairs is replaced by a pair of paddle brackets. Alternative spacing of the paddle brackets may also be used, for example, paddle brackets could, instead, replace every third set of outer link plate pairs along the length of the chain.

The pairs of link plates and paddle brackets are pivotally connected by pin assemblies 112, which define pivot axes 117 that extend transverse to the longitudinal axis 86. Pin assembly 112 is a conventional pin assembly used with roller chains and generally performs well, however, pivotal connector arrangements known in the art may alternatively be used.

Figure 6A:
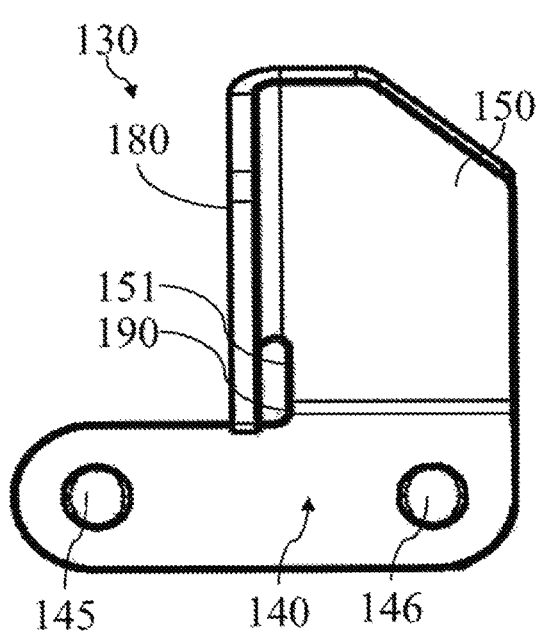
FIG. 6A is a side view of a prior art paddle bracket.

FIG. 6A shows a typical prior art paddle bracket 130. Paddle bracket 130 attaches to the elevator chain in the same way as an ordinary outer link plate 105. Paddle bracket 130 also attaches to and supports a paddle 95. The link portion 140 of paddle bracket 130 contains pin holes 145 and 146 for receiving pin assemblies 112. Intermediate portion 150 of paddle bracket 130 connects link portion 140 to the paddle attachment portion 180. There is a bend between link portion 140 and intermediate portion 150 such that the planar intermediate portion extends at an approximately 30° angle from the position it would have been in if it remained in the same plane as link portion 140. The link portion 140 and the inner edge 151 of intermediate portion 150 meet at point 190 of the bent section between the intermediate portion 150 and link portion 140. Intermediate portion 150 also connects in an approximately 90° curve to the paddle attachment plate 180, which contains the hole 155 (shown in FIG. 3B) for attaching the paddle 95. The prior art elevator chain 83 most often fails at the paddle bracket 130.

To better understand why the paddle brackets typically break, it is noted that an elevator chain in a harvesting application such as combine 1 must often move between 8 and 30 cubic feet of grain per minute. For reference, a standard pickup truck bed can hold approximately 60 cubic feet of grain. Thus the paddle bracket is moving quickly in the endless loop formed by the elevator chain circuit. Obviously, this can generate significant forces on the paddles moving the grain and, thus, also on the paddle brackets to which the paddles are attached. If the chain moves out of alignment due to wear of the chain or other components of the system, this can cause the paddles moving the grain to rub against the housing this generates even greater forces on the paddles and paddle brackets and often leads to the failure of the paddle bracket if the situation is not corrected.

The inventors of the present application have noticed that when using prior art paddle brackets 130, the failure of the paddle bracket often occurs at the bend which forms the junction between the link portion 140 and the intermediate portion 150 of the paddle bracket 130.

Figure 6B:
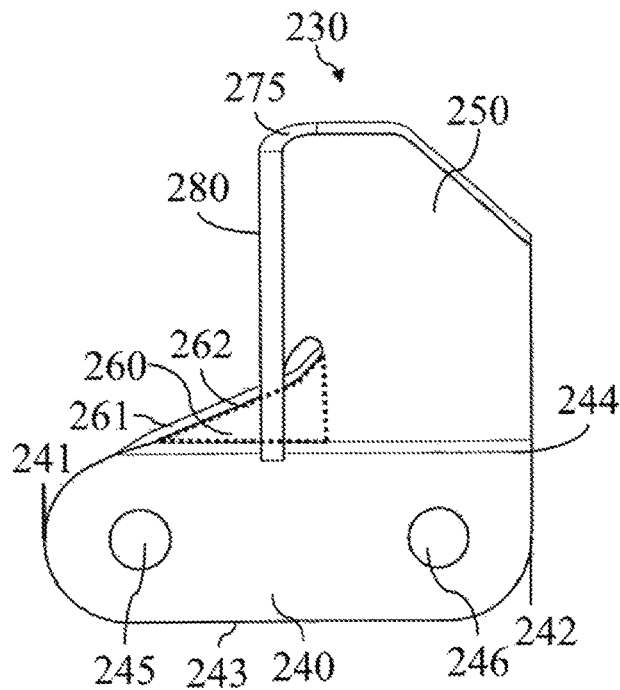
FIG. 6B is a side view of an exemplary embodiment of a paddle bracket with enhanced strength.
Figure 6C:
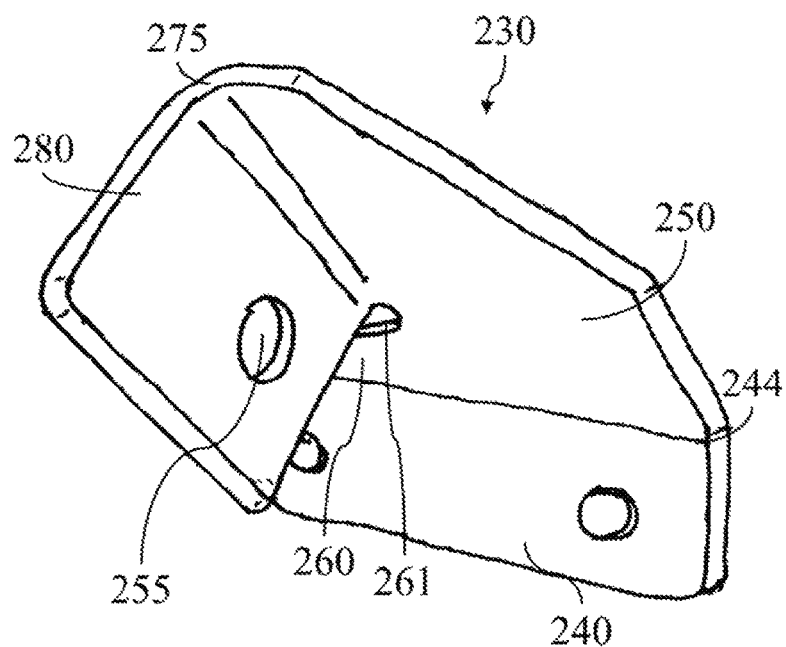
FIG. 6C is a perspective view of a paddle bracket.

FIGS. 6B and 6C illustrate an example of an improved paddle bracket 230 which is more resistant to such failures. Paddle bracket 230 is formed from a sheet material and includes a link portion 240, an intermediate portion 250, a brace portion 260 and a paddle attachment portion 280.

Link portion 240 defines a link plane and has a first longitudinal end 241 and a second longitudinal end 242. An elongate edge 243 extends from the first longitudinal end 241 to the second longitudinal end 242 and an elongate boundary 244 of the link portion extends from the first longitudinal end 241 to the second longitudinal end 242. In the illustrated embodiment, elongate boundary 244 extends parallel to the elongate edge 243 with the elongate boundary 244 corresponding to the upper edge of a conventional link plate. In the illustrated embodiment, paddle bracket 230 replaces an outer link plate 105 and the distance between the elongate edge 243 and elongate boundary 244 is roughly equivalent to the distance between the two elongate edges of an outer link plate 105.

Openings 245, 246 define where pin assemblies 112 will be located and thus also define where the pivot axes 117 of the pin assemblies 112 will be located. In this regard, it is noted that outer and inner link plates are symmetrical with the pivot axes 117 being equidistant between the upper and lower edges of the link plates. Similarly, pivot axes 117 defined by pin assemblies 112 used to secure paddle brackets 230 are located equidistantly between the elongate boundary 244 and the elongate edge 243.

Link portion 240 is pivotally attached to an adjacent pair of link plates at each end of the link portion 240. Each of the adjacent pairs of link plates are attached with a pin assembly 112 proximate one of the first and second longitudinal ends 241, 242. In the illustrated embodiment, the elongate boundary 244 is parallel with the longitudinal axis 86 of elevator chain 85 between the pin assemblies 112.

Intermediate portion 250 defines a plane and is coupled with link portion 240 by a bent section 254 such that intermediate portion 250 is displaced at an angle of approximately 30° out of the plane defined by the link portion 240. Bent section 254 extends along the elongate boundary 244 of link portion 240. Link portion 240 is positioned on one side of bent section 254 while brace portion 260 and intermediate portion 250 are both positioned on the other side of bent section 254 such that brace portion 260 and intermediate portion 250 extend at an angle to the plane defined by the link portion 240. In other words, bent section 254 connects both the brace portion 260 and the intermediate portion 250 to link portion 240. Brace portion 260 and intermediate portion 250 extend away from the longitudinal axis 86 when installed in a chain.

Intermediate portion 250 is connected to paddle attachment portion 280 by a bent section 275. The intermediate portion 250 is thereby disposed between the elongate boundary 244 of link portion 240 and bent section 275. Intermediate portion 250 is longitudinally positioned between the plane defined by paddle attachment portion 280 and the second longitudinal end 142. Bent section 275 defines a bend between intermediate portion 250 and paddle attachment portion 280 and also connects these two portions whereby the plane defined by the intermediate portion 250 and the plane defined by the paddle attachment portion 280 are disposed at an angle to each other. The two bent sections 254, 275 place the paddle attachment portion 280 in an orientation such that the plane defined by paddle attachment portion 280 is transverse to the plane defined by link portion 240, i.e., it is at an approximately 90° angle with the plane defined by link portion 240.

In the illustrated embodiment the paddle attachment portion 280 is a planar section and is also referred to herein as an attachment plate. Paddle attachment plate 280 includes an opening 255 by which it is attachable to a paddle 95.

Brace portion 260 enhances the strength of paddle bracket 230 and is indicated by dashed lines 262 in FIG. 6B. In the prior art paddle bracket 130 which does not have a brace portion, stresses are concentrated at the junction of the intermediate portion and the link portion and this is the location where such prior art paddle brackets often fail.

Brace portion 260 of the exemplary embodiment 230 is disposed between the elongate boundary 244 of link portion 240 and intermediate portion 250 and longitudinally positioned between the first longitudinal end 241 and the plane defined by the paddle attachment portion 280. Brace portion 260 is coupled with the intermediate portion 250 at a location between the elongate boundary 244 and bent section 275 and is coupled with the link portion 240 at a longitudinal location between the first longitudinal end 241 and the plane defined by the paddle attachment portion 280 whereby the brace is capable of transmitting forces between the intermediate portion 250 and the link portion 240. By providing a greater area over which forces may be transmitted between intermediate portion 250 and link portion 240, the stress induced by such forces is reduced and the strength of the paddle attachment bracket 230 in enhanced.

In the illustrated embodiment, brace portion 260 is wedge-shaped and defines a progressively larger width from a tip of the wedge to an opposing end of the wedge with the tip of the wedge being disposed proximate the first longitudinal end 241 and the opposing end of the wedge being defined by where the brace is connected with the intermediate portion 250 along a boundary parallel with the plane defined by the paddle attachment portion 280. The inclined edge 261 of the brace portion 260 has a first inclination beginning at its tip and then forms a second, steeper, incline in the section located between paddle attachment portion 280 and intermediate portion 250.

In the illustrated embodiment, no bend separates the brace portion from the intermediate portion. In other words, brace portion 260 lies in the same plane as the intermediate portion 250.

Paddle bracket 230 also has a bainitic microstructure which enhances its strength relative to prior art paddle bracket 130. Agricultural chains are generally made from tempered martensitic steel and inner and outer link plates 105, 110 of both prior art chain 83 and chain 85 are formed out of conventional tempered martensitic steel. Prior art paddle bracket 130 is also formed out of tempered martensitic steel.

Figure 7A:
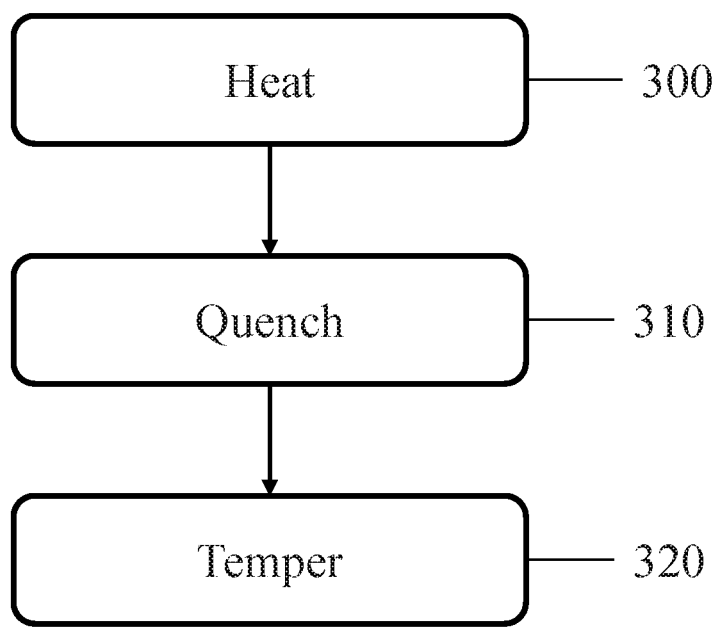
FIG. 7A is a flow chart representing a method for hardening and tempering steel.

FIG. 7A schematically depicts a process for forming tempered martensitic steel. Carbon steel is heated in a furnace, as indicated by box 300, to a temperature above its austenitizing temperature, i.e., heating the steel above the temperature at which the steel changes its crystal structure to the more open structure of austenite which enables it to absorb carbon. It is then quenched in an oil bath as indicated by box 310, causing it to cool quickly and harden. Rapidly cooling the steel below the martensite start temperature of the material causes the austenite to transform into martensite. The steel is then tempered, as indicted by box 320, to its desired hardness. For example, the inner and outer link plates 105, 110 of chain 85 may have a final desired Rockwell hardness within the range of 38-48 HRC. Tempering involves heating the steel to a temperature below their critical point and then allowing the parts to cool, e.g., slowly cool in the ambient air, to thereby remove some of the hardness created in the quenching process. The resulting microstructure of the steel is a tempered martensite.

Figure 7B:
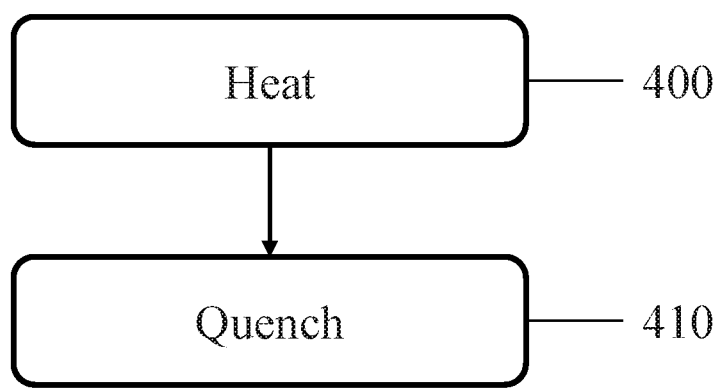
FIG. 7B is a flow chart representing a method for austempering steel.

FIG. 7B schematically depicts an austempering process for treating the paddle bracket to provide it with enhanced durability. The paddle bracket 230 is advantageously manufactured using a sheet material formed out of a carbon steel alloy, advantageously, a carbon steel alloy with a relatively high chromium content. For example, the sheet material used to form the paddle bracket may be a steel allow with a medium carbon content in the range of 0.3 to 0.6 percent, or, more specifically within the range of 0.38 to 0.43 percent carbon. The steel alloy material advantageously also has a relatively high chromium content within the range of 0.4 to 1.1 percent. For example, steel alloys such as AISI 4140, 5140, or 8640 steel alloys or 40Cr, 42CrMo, or 40CrNiMo steel alloys, may be used. In the illustrated embodiment, paddle bracket 230 is formed out of 40Cr/5140 steel alloy. Other suitable steels and other materials may alternatively be used to form paddle bracket 230.

The austempering process involves heating the steel alloy in a furnace above its austenitizing temperature as indicated by box 400. Next it is quenched at a temperature above the martensite start temperature of the steel alloy as represented by box 410. In the illustrated embodiment, the paddle brackets 230 are quenched in a molten salt bath. By quenching the steel alloy quickly enough to avoid the formation of pearlite and at a relatively high temperature, e.g., above the martensite start temperature of the steel alloy, the resulting microstructure is a bainite instead of a martensite. This quenching process also brings the paddle brackets 230 to their final desired hardness, for example, within the Rockwell hardness range of 44 to 50 HRC, without any post-quenching tempering step. The resulting bainite microstructure, not only eliminates the need for a post-quenching tempering step but it also generates less distortion in the shape of hardened material compared to conventional quenching and tempering producing a martensite microstructure. The ability of the paddle brackets 230 to reduce metal fatigue is also enhanced by the bainite microstructure compared to a conventional tempered martensite microstructure.

The overall process used to create the improved paddle bracket 230 involves stamping a blank from sheet material, bending it into the desired shape, and then austempering the paddle bracket to give it a bainitic microstructure.

Figure 8:
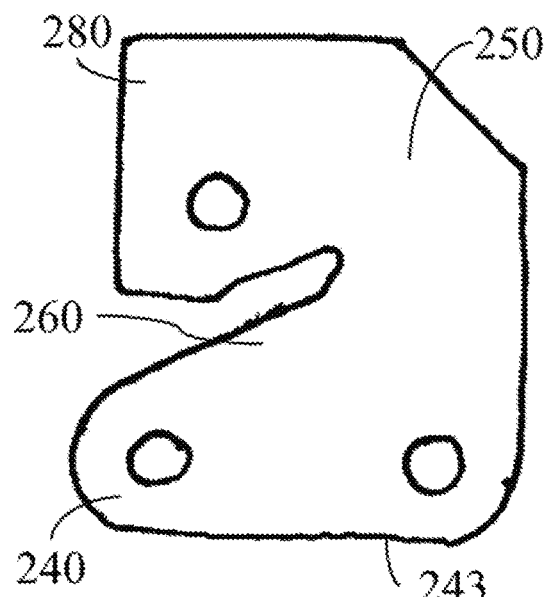
FIG. 8 is a top view of a paddle bracket after it has been stamped from sheet material and before it has been bent.

In one embodiment, the process for making a paddle bracket 230 for use with an elevator chain assembly 85 involves stamping the paddle bracket 230 from a sheet of material having a consistent thickness. FIG. 8 depicts a blank of a paddle bracket 230 after it has been stamped from a sheet of material while it is still in the form of a flat sheet of material and before it has been bent into its final shape and before it has been austempered. Stamping the sheet material forms the general outline of the part and may also be used to form the openings in the paddle attachment portion 280 and the link portion 240. Alternative methods of forming paddle bracket 230 can be employed, but stamping is a highly cost-efficient method.

Figure 9:
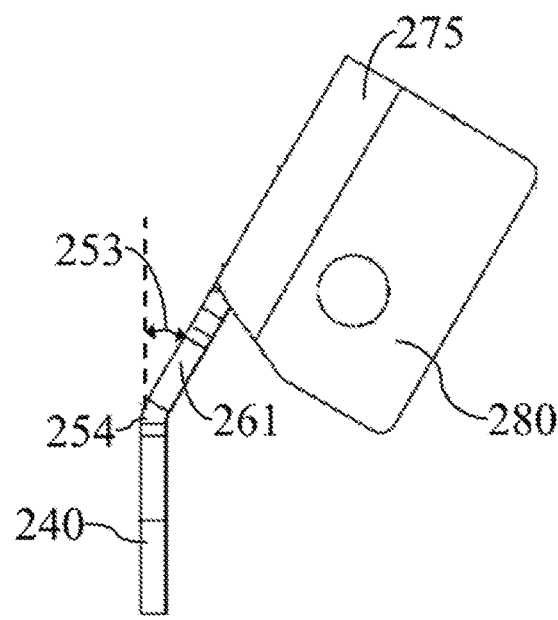
FIG. 9 is a side view of an exemplary paddle bracket in its final shape.
Figure 10:
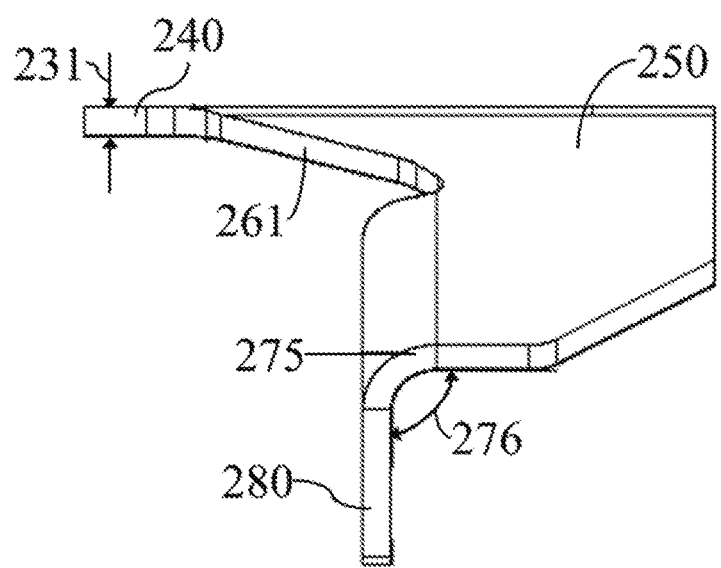
FIG. 10 is another side view of the paddle bracket of FIG. 9.

After deburring the stamped edges, the part is bent into its final shape. The illustrated embodiment includes two bends and there is no required order for making the bends. As best seen in FIG. 10, paddle attachment portion 280 is bent relative to intermediate portion 250 to form bent section 275 whereby the paddle attachment portion 280 and intermediate portion 250 form an angle 276 of approximately 90 degrees. As best seen in FIG. 9, a bent section 254 is formed such that intermediate portion 250 is positioned at an angle 253 to the plane defined by the link portion 240. In the illustrated embodiment, angle 253 is approximately 30 degrees. In combination, the two bends position the paddle attachment portion 280 transversely to link portion 240. This arrangement allows for the attachment of a simple planar paddle structure that will also be oriented transverse to the longitudinal axis 86 of the chain 85. Such a planar paddle 95 attached to a pair of paddle brackets 230 is shown in FIG. 5B in dashed lines.

As mentioned above, as used herein, the term "consistent thickness" encompasses slight variations in thickness such as those variations falling within typical manufacturing tolerances for sheet material and slight deformations caused by bending and minor deformations proximate stamped edges. Thus, paddle bracket 230 has a consistent thickness 231 even though there may be slight variations in the thickness in bent sections 253, 275 and adjacent the stamped edges of the part.

After bending the paddle bracket into its final shape as depicted in FIGS. 9 and 10, the paddle bracket is then austempered as described above. After austempering, the part may advantageously be shot peened for approximately 30 minutes to provide approximately 100 percent surface coverage. The paddle brackets 230 are then installed in a chain.

When installing the illustrated embodiment of the brackets 230, a pair of the brackets will be installed at a single link location with a single transverse extending paddle 95 being attached to both of the brackets 230 as best understood with reference to FIG. 5B.

For example, it will generally be desirable to use a pair of paddle brackets 230 to replace a pair of outer link plates 105 such that the paddle attachment portions 280 of the two paddle brackets 230 lie in common plane to thereby facilitate the attachment of a single planar paddle 95 to the two paddle attachment portions 280. It will also generally be desirable to use a plurality of such pairs of paddle brackets 230 at regularly spaced intervals along the length of the chain to replace corresponding pairs of outer link plate pairs with each set of two paddle brackets 230 being attached to a single paddle 95.

Alternative embodiments, however, could provide a chain wherein the paddle brackets are used to replace pairs of inner link plates 110 and it would also be possible for a chain to replace both inner and outer link plates. For example, positioning the paddle brackets regularly along the chain at an interval that corresponds to an odd number of links. It will also generally be advisable to use a pair of paddle brackets 230 to attach a single paddle 95, however, other configurations are possible.

It is also noted that the shape and configuration of the paddle is dependent upon the shape of the interior volume of the housing through which the grain will be moved by the chain and that paddles having various other configurations can be attached to the chain. It is also noted that the illustrated embodiment is a single strand roller chain and that paddle brackets in accordance with the present disclosure can also be used with multi-strand roller chains. For example, in some applications having a multi-strand roller chain, only the outermost links might be replaced with paddle brackets such that there are two paddle brackets at each paddle location on the chain. In other embodiments, an interior one of the link plates might also be replaced such that there are three or more paddle brackets at each paddle location on the chain wherein the paddle brackets are configured such that they provide sufficient clearance to each other.

Testing of the illustrated embodiment of chain 85 with paddle brackets 230 using collision fatigue testing showed that chain 85 with paddle brackets 230 had improved performance over a chain employing conventional paddle brackets 130. More specifically, the minimum number of cycles for such a chain to survive and the average number of cycles for a chain 85 with paddle brackets 230 to survive before failure were both significantly improved over a chain with conventional paddle brackets 130. More specifically, the testing showed that the average number of cycles survived by chain 85 having paddle brackets 230 was approximately 2.5 times greater than the average number of cycles survived by a chain with conventional paddle brackets 130.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMBERS 1 combine
10 header support
15 threshing rotor
20 shoe
25 sieve
30 sieve
35 transverse beater
40 rotating spreader
45 blower
50 clean grain pan
55 tailings pan
60 grain elevator
65 auger
70 storage bin
75 chute
80 prior art chain
83 elevator housing
85 elevator chain
86 longitudinal axis of elevator chain
90 sprockets
95 paddles
100 compartments formed between paddles
105 outer link plate of elevator chain
110 inner link plate of elevator chain
112 pin assembly 115 pin
117 pivot axis
120 bushing
125 roller
130 prior art paddle bracket
135 offset link plate
140 prior art link portion
141 first longitudinal end of link portion
142 second longitudinal end of link portion
145 prior art pin hole for attaching link to chain
146 prior art pin hole for attaching link to chain
150 prior art intermediate portion of paddle bracket
151 inner edge of prior art intermediate portion
155 prior art paddle attachment hole
180 prior art paddle attachment plate
190 point where the inner edge of the intermediate portion and the link portion intersect
230 paddle bracket
231 thickness
240 link portion of paddle bracket
241 first longitudinal end of link portion
242 second longitudinal end of link portion
243 elongate edge of link portion
244 elongate boundary of link portion
245 pin hole for attaching link to chain
246 pin hole for attaching link to chain
250 intermediate portion of paddle bracket
253 angle
254 bent section
255 paddle attachment hole
260 brace portion
261 inclined edge of the brace
262 dashed line identifying brace portion 260
275 bent section
276 angle
280 paddle attachment plate
300 heat step
310 quench step
320 tempering step
400 heat step
410 quench step

What is claimed is:

1. An elevator chain assembly comprising:
a length of chain defining a longitudinal axis, the length of chain including a plurality of inner link plate pairs and a plurality of outer link plate pairs, wherein the inner link plate pairs and the outer link plate pairs alternate along the length of the chain;
a plurality of pin assemblies positioned at regularly spaced intervals along the length of the chain wherein the plurality of pin assemblies pivotally connect the plurality of inner link plate pairs with the plurality of outer link plate pairs, the pin assemblies each defining a pivot axis; and
at least one paddle bracket, the paddle bracket replacing at least one of the inner link plates or the outer link plates, wherein the paddle bracket is formed out of a sheet material and comprises:
a link portion defining a link plane, the link portion having a first longitudinal end, a second longitudinal end, an elongate edge that extends from the first longitudinal end to the second longitudinal end, and an elongate boundary that extends from the first longitudinal end to the second longitudinal end opposite the elongate edge, wherein the link portion is pivotally attached to an adjacent pair of link plates proximate each of the first and second longitudinal ends by first and second pin assemblies, and wherein the elongate boundary is parallel with the longitudinal axis between the first and second pin assemblies and the pivot axes of the first and second pin assemblies are located equidistantly between the elongate boundary and the elongate edge;
a paddle attachment portion defining a paddle attachment plane extending transverse to the link plane, the paddle attachment portion being attachable to a paddle;
an intermediate portion defining an intermediate plane, the intermediate portion disposed between the elongate boundary of the link portion and a first bent section and being longitudinally positioned between the paddle attachment plane and the second longitudinal end, the first bent section defining a bend between and connecting the intermediate portion and the paddle attachment portion whereby the intermediate plane and the paddle attachment plane are disposed at an angle to each other; and
a brace portion disposed between the elongate boundary of the link portion and the intermediate portion and longitudinally positioned between the first longitudinal end and the paddle attachment plane, the brace portion being coupled with the intermediate portion at a first location between the elongate boundary and the first bent section and being coupled with the link portion at a longitudinal location between the first longitudinal end and paddle attachment plane whereby the brace is capable of transmitting forces between the intermediate portion and the link portion.

2. The elevator chain assembly of claim 1, wherein the paddle bracket is formed out of austempered steel.

3. The elevator chain assembly of claim 2, wherein the austempered steel has a bainitic microstructure.

4. The elevator chain assembly of claim 3, wherein the paddle brackets are made out of a steel alloy with a medium carbon content within the range of 0.3 to 0.6 percent and a chromium content within the range of 0.4 to 1.1 percent.

5. The elevator chain assembly of claim 1, wherein the paddle bracket defines a second bent section extending along the elongate boundary of the link portion between the link portion on one side of the second bent section and the brace portion and the intermediate portion on the other side of the second bent section and wherein the brace and the intermediate portion extend at an angle to the link plane and away from the longitudinal axis.

6. The elevator chain assembly of claim 5 wherein the brace portion lies within the same plane as the intermediate portion.

7. The elevator chain assembly of claim 6 wherein the brace is wedge-shaped and defines a progressively larger width from a tip of the wedge to an opposing end of the wedge with the tip of the wedge being disposed proximate the first longitudinal end and the opposing end of the wedge being defined by where the brace is connected with the intermediate portion along a boundary parallel with the paddle attachment plane.

8. The elevator chain assembly of claim 7 wherein the paddle bracket is formed out of a single piece of continuous sheet material bent into its final configuration, the sheet material having a consistent thickness.

9. The elevator chain assembly of claim 1 wherein paddle bracket replaces one of the outer link plates.

10. The elevator chain assembly of claim 9 wherein the at least one paddle bracket comprises a pair of paddle brackets, the pair of paddle brackets replacing one of the plurality of outer link plate pairs and wherein the paddle attachment portions of the two paddle brackets lie in a common plane whereby the pair of paddle brackets are adapted to be attached to a single planar paddle.

11. The elevator chain assembly of claim 10 further comprising a plurality of paddle bracket pairs regularly spaced along the length of the chain and replacing a corresponding plurality of outer link pairs and wherein each one of the plurality of paddle bracket pairs are adapted to be attached to a single planar paddle and the elevator chain assembly is formed into an endless loop with paddle attachment portions extending outwardly.

12. A paddle bracket for an elevator chain assembly, the elevator chain assembly having a length of chain defining a longitudinal axis, the length of chain including a plurality of inner link plate pairs and a plurality of outer link plate pairs, wherein the inner link plate pairs and the outer link plate pairs alternate along the length of the chain and a plurality of pin assemblies positioned at regularly spaced intervals along the length of the chain wherein the plurality of pin assemblies pivotally connect the plurality of inner link plate pairs with the plurality of outer link plate pairs wherein a pair of the paddle brackets are adapted to replace one pair of either the plurality of inner link plate pairs or the plurality of outer link plate pairs, each one of the pair of paddle brackets comprising:
  a link portion defining a link plane and having a first longitudinal end, a second longitudinal end, an elongate edge that extends from the first longitudinal end to the second longitudinal end, and an elongate boundary that extends from the first longitudinal end to the second longitudinal end opposite the elongate edge, wherein the link portion is pivotally attached to an adjacent pair of link plates proximate each of the first and second longitudinal ends by first and second pin assemblies, and wherein the elongate boundary is parallel with the longitudinal axis between the first and second pin assemblies and pivot axes defined by the first and second pin assemblies are located equidistantly between the elongate boundary and the elongate edge;
  a paddle attachment portion defining a paddle attachment plane extending transverse to the link plane and being attachable to a paddle;
  an intermediate portion defining an intermediate plane, the intermediate portion disposed between the elongate boundary of the link portion and a first bent section and being longitudinally positioned between the paddle attachment plane and the second longitudinal end, the first bent section defining a bend between and connecting the intermediate portion and the paddle attachment portion whereby the intermediate plane and the paddle attachment plane are disposed at an angle to each other; and
  a brace portion disposed between the elongate boundary of the link portion and the intermediate portion and longitudinally positioned between the first longitudinal end and the paddle attachment plane, the brace portion being coupled with the intermediate portion at a first location between the elongate boundary and the first bent section and being coupled with the link portion at a longitudinal location between the first longitudinal end and paddle attachment plane whereby the brace is capable of transmitting forces between the intermediate portion and the link portion.

13. The paddle bracket of claim 12 wherein the paddle bracket is formed out of austempered steel.

14. The paddle bracket of claim 13 wherein the austempered steel has a bainitic microstructure.

15. The paddle bracket of claim 14, wherein the paddle brackets are made out of a steel alloy with a medium carbon content within the range of 0.3 to 0.6 percent and a chromium content within the range of 0.4 to 1.1 percent.

16. The paddle bracket of claim 12 wherein the paddle bracket defines a second bent section extending along the elongate boundary of the link portion between the link portion on one side of the second bent section and the brace portion and the intermediate portion on the other side of the second bent section and wherein the brace and the intermediate portion extend at an angle to the link plane and away from the longitudinal axis;
  wherein the brace portion lies within the same plane as the intermediate portion and the brace portion is wedge-shaped and defines a progressively larger width from a tip of the wedge to an opposing end of the wedge with the tip of the wedge being disposed proximate the first longitudinal end and the opposing end of the wedge being defined by where the brace portion is connected with the intermediate portion along a boundary parallel with the paddle attachment plane; and
  wherein the paddle bracket is formed out of a single piece of continuous sheet material bent into its final configuration, the sheet material having a consistent thickness.

17. A method for making a paddle bracket for use with an elevator chain assembly:
  stamping the paddle bracket from a sheet of material having a consistent thickness wherein the stamped paddle bracket includes a link portion having a first longitudinal end, a second longitudinal end, an elongate edge that extends from the first longitudinal end to the second longitudinal end, and an elongate boundary that extends from the first longitudinal end to the second longitudinal end opposite the elongate edge and wherein first and second openings are stamped into the link portion, the first opening proximate the first longitudinal end and the second opening proximate the second longitudinal end, the first and second openings being adapted to receive pin assemblies for attaching the paddle bracket to the chain assembly, the elongate boundary being parallel to a longitudinally extending line connecting the centers of the first and second openings; a paddle attachment portion; an intermediate portion disposed between the elongate boundary of the link portion and a first bent section and being longitudinally positioned between the second longitudinal end and a first longitudinal position between the first and second openings, the first bent section connecting the intermediate portion and the paddle attachment portion; and a brace portion disposed between the elongate boundary of the link portion and the intermediate portion and longitudinally positioned between the first longitudinal end and the first longitudinal position, the brace portion being coupled with the intermediate portion at the first longitudinal position between the elongate boundary and the first bent section and being coupled with the link portion between the first longitudinal end and the first longitudinal position and wherein a second bent section extends parallel with the elongate boundary and connects the link portion with the brace portion and the intermediate portion;

bending the first bent section to position the paddle attachment portion at an angle relative to the intermediate portion; and bending the second bent section to position the link portion at an angle relative to the intermediate portion and the brace portion such that a paddle attachment plane defined by the paddle attachment portion is oriented transverse to a link plane defined by the link portion.

18. The method of claim 17 further comprising the steps of:

heating the paddle bracket to a temperature above the austenitizing temperature of the sheet material; and quenching the heated paddle bracket at a temperature above the martensite start temperature of the sheet material.

19. The method of claim 18 wherein the sheet material is a steel alloy with a medium carbon content within the range of 0.3 to 0.6 percent and a chromium content within the range of 0.4 to 1.1 percent.

20. The method of claim 19 further comprising the step of:

attaching a pair of the paddle brackets to a chain assembly and attaching a single paddle to the pair of paddle brackets.

* * * * *